United States Patent [19]

Gyorgy et al.

[11] Patent Number: 5,665,465
[45] Date of Patent: Sep. 9, 1997

[54] ARTICLE COMPRISING EXCHANGE-COUPLED MAGNETIC MATERIALS

[75] Inventors: Ernst Michael Gyorgy, deceased, late of Chatham, N.J., by Suzanne Rachel Gyorgy, executrix; Julia Mae Phillips, Albuquerque, N. Mex.; Yuri Suzuki, Summit; Robert Bruce van Dover, Maplewood, both of N.J.

[73] Assignee: Lucent Technologies Inc., Murray Hill, N.J.

[21] Appl. No.: 554,071

[22] Filed: Nov. 6, 1995

[51] Int. Cl.$^6$ .................... G11B 5/66; B32B 33/00
[52] U.S. Cl. .................. 428/328; 428/329; 428/693; 428/701; 428/900
[58] Field of Search .................... 428/328, 329, 428/693, 701, 900

[56] References Cited

U.S. PATENT DOCUMENTS 4,883,710  11/1989  Machida .................. 428/336
5,030,512   7/1991  Kato et al. ............... 428/336

OTHER PUBLICATIONS

"Physics of Thin Films", by A. Yelon, Academic Press, New York 1971, vol. 6, pp. 205–300.
"Unshielded MR Elements With Patterned Exchange–Biasing", by C. Tsang, *IEEE Transactions on Magnetics*, vol. 25, No. 5, Sep. 1989, pp. 3692–3694.
"Application of YIG Film to Thin Film Inductors", by K. I. Arai et al., *IEEE Transactions on Magnetics*, vol. 27, No. 6, Nov. 1991, pp. 5337–5339.
"Introduction to Magnetic Materials", by B. D. Cullity, Addison–Wesley 1972, pp. 422–425.
"Introduction to Magnetic Materials", by B. D. Cullity, Addison–Wesley 1972, pp. 18–21.
"Handbook of Microwave Ferrite Materials", edited by Wilhelm H. von Aulock, Academic Press, New York 1965.

*Primary Examiner*—Stevan A. Resan
*Attorney, Agent, or Firm*—Eugen E. Pacher

[57] ABSTRACT

Articles according to the invention exemplarily comprise a magnetically hard oxide layer in contact with a magnetically soft oxide layer, with spins in the latter at room temperature exchange-coupled to the (oriented) spins in the former. Exemplarily both materials are ferrimagnetic spinel-type oxides, e.g., $CoFe_2O_4/(Mn, Zn)Fe_2O_4$. Material combinations according to the invention can be advantageously used in high frequency circuit components such as inductors, since the magnetically soft layer can be in a substantially single domain state even after exposure to a magnetic field of considerable strength, e.g., up to about 500 Oe.

15 Claims, 3 Drawing Sheets

ARTICLE COMPRISING EXCHANGE-COUPLED MAGNETIC MATERIALS

FIELD OF THE INVENTION

This invention pertains to articles that comprise exchange-coupled magnetic materials.

BACKGROUND OF THE INVENTION

Ferromagnetic or ferrimagnetic (collectively "FM") oxide materials have found widespread use in passive circuit components, e.g., in resonators or inductors, because the low conductivity of these materials eliminates eddy current losses. Typically the materials are used in bull or thick film form, although their use in thin film form is not precluded.

In prior art devices it is typically not possible to ensure that the FM oxide material contains a single magnetic domain, since readily encountered stray fields of only a few oersted can destroy a pre-existing single-domain state, thereby introducing domain walls into the material. However, the presence of domain walls results in power dissipation in an applied time-varying field, limiting the usefulness of prior art FM oxide circuit elements typically to frequencies of about 10 MHz or less.

In view of the current rapid growth of the utilization of the frequency region of about 100 MHz-2 GHz for communication purposes (e.g., for cellular telephony), it would be highly desirable to have available circuit elements that comprise FM oxide material that can be single domain in substantially any stray magnetic field such a circuit element is likely to encounter, and that thus is not limited by dissipation due to domain wall motion. More specifically, it would be highly desirable to have available FM oxide-containing circuit elements that can be used at higher frequencies than prior art FM oxide elements, exemplarily including the range 100 MHz-2 GHz. This application discloses a technique for obtaining such elements, and elements produced thereby.

It is well known that the quantum mechanical exchange interaction can lead to spin coupling across the interface between two magnetically ordered materials. The resulting interface energy leads to exchange anisotropy. See, for instance, A. Yelon, "Physics of Thin Films", Academic Press, New York 1971, Vol. 6, pp. 205–300.

Exchange anisotropy has been observed at room temperature only in a relatively small number of material combinations (typically thin films), which are, to the best of our knowledge, either metal/metal or metal/oxide combinations.

A particular metal/metal exchange coupled combination (MnFe/NiFe) has attained technological significance as the basis for a biasing scheme for magnetoresistive (MR) heads used in magnetic data storage. See, for instance, C. Tsang, *IEEE Trans. Mag.*, Vol. 25, 3692 (1989). Note that MnFe is an antiferromagnet (AFM), and $Ni_{1-x}Fe_x$ (PERMALLOY) is a soft FM material. M-H loop offsets in the range 10–100 Oe are obtained in this system, with blocking temperatures (above which the exchange anisotropy is negligible) of about 250° C.

K. I. Arai et at., *IEEE Trans. Mag.*, Vol. 27, 5337 (1991) report the application of YIG (yttrium iron garnet) to thin film inductors, with an external field applied to suppress domain-wall motion and consequent dissipation.

For a brief discussion of some aspects of exchange anisotropy, see B. D. Cullity, "Introduction to Magnetic Materials", Addison-Wesley 1972, pp. 422–425, incorporated herein by reference.

SUMMARY OF THE INVENTION

In a broad aspect the invention is embodied in an article (e.g., communication equipment that comprises an inductor or resonator) that comprises a quantity of a first magnetic material and a quantity of a second magnetic material in contact with the first magnetic material and having an interface therewith. Associated with each of the first and second magnetic materials is a spin orientation that can be a function of position in the material. The first and second magnetic materials are selected such that, over a temperature range that includes room temperature (20° C.), the spin orientation in the second magnetic material is, in at least a potion of the second magnetic material that is adjacent to the interface between the first and second magnetic materials, a function of the spin orientation of the first magnetic material. Significantly, each of the first and second magnetic materials is a metal oxide magnetic material.

Equivalently, the first and second magnetic materials are selected such that there is associated with the combination an interface anisotropy that provides substantial pinning of the second magnetic material spins at the interface, with the orientation of the pinned spins being a function of the spin orientation in the first magnetic material. Associated with the interface is an interface anistropy energy $K_{int}$ (defined as the magnetization of the second material times the measured offset field $H_{ex}$ times the thickness of the second layer) that is a measure of the strength of spin pinning. In preferred embodiments this energy is typically greater than about $10^{-2}$ erg/cm$^2$ at room temperature. Combinations with interface anisotropy energy substantially below that value at room temperature are typically not of technological interest since the pinning strength would be too low to ensure maintenance of a single domain state in typical stray fields.

A spin in the second magnetic material herein is considered to be "adjacent" to the interface if the spin is within the characteristic domain wall thickness of the second material to the interface.

Although combinations according to the invention are not necessarily combinations of layers of magnetic materials, the discussion below will generally be in terms of layer structures. This is done for ease of exposition and definiteness, and is not intended to limit the scope of the invention.

Magnetic oxide materials according to the invention typically are selected from the spinel-type oxides, the garnet-type oxides, and the cobalt Y-type hexaferrites, with spinel/spinel combinations currently most preferred. A given magnetic oxide can be a ferromagnet, ferrimagnet, antiferromagnet or compensated ferrimagnet at room temperature, with ferrimagnetic/ferrimagnetic combinations that comprise magnetically hard first material and magnetically soft second material currently most preferred. An exemplary combination comprises $CoFe_2O_4$ first material, with second material selected from $(Mn, Zn) Fe_2O_4$, $(Li, Fe) Fe_2O_4$ or $(Ni, Zn) Fe_2O_4$. In further exemplary combinations the first material is a spinel-or garnet-type magnetic oxide near compensation (e.g., with a compensation temperature in the range 20° C.±50° C., exemplarily $NiFeCrO_4$). In currently preferred embodiments both the first and the second magnetic oxide material are thin films, the second material thin film typically being at most 1 μm thick. Desirably at least one of the thin films is a substantially single crystal thin film. Exemplarily the single crystal thin film is a magnetically hard first material thin film oriented such that an easy axis of the magnetic material lies in the plane of the film. The substantially single crystal thin film typically is grown on a single crystal substrate of appropriate composition, lattice structure and lattice constant. Optionally a buffer layer is interposed between the single crystal substrate and the single crystal magnetic oxide thin film. In currently most preferred embodiments both the first and the second magnetic oxide thin films are substantially single crystal thin films.

In preferred embodiments of the invention the interface (exchange) anisotropy is of sufficient strength to return the second magnetic oxide material to a domain wall-free state after exposure to typically encountered stray magnetic fields, exemplarily to fields up to about 500 Oe.

DETAILED DESCRIPTION OF SOME PREFERRED EMBODIMENTS

"Exchange anisotropy" refers to the unidirectional anisotropy observed in heterogeneous magnetic systems due to coupling between two (or more) magnetic materials in contact with each other. The coupling is due to the same exchange processes that lead to ordered magnetic behavior in homogeneous systems (e.g., ferromagnetism, ferrimagnetism or antiferromagnetism). Because the exchange interaction is short-range, exchange anisotropy operates generally over a short length scale, typically less than 1 μm.

We have observed the existence of exchange anisotropy in magnetic metal oxide/magnetic metal oxide combinations (typically layer structures), and have discovered that such combinations can have magnetic properties that make them suitable for, e.g., high frequency circuit components such as inductors and resonators. Among currently preferred magnetic metal oxides are spinel-type, garnet-type, and cobalt Y-type hexaferrite metal oxides, with same-type combinations (e.g., spinel type/spinel type) currently preferred.

A combination according to the invention generally comprises a metal oxide biasing layer in combination with a layer of magnetically soft oxide material. Multilayer (i.e., more than two layers) combinations that comprise interleaved biasing layers and magnetically soft oxide layers are also contemplated, as are non-thin-film combinations, e.g., a body comprising a mixture of first and second magnetic oxide particles, optionally together with a binder (e.g., epoxy), or particles of one type coated with material of the other type.

The biasing layer will frequently comprise magnetically hard ferromagnetic or ferrimagnetic material, but biasing layers that comprise antiferromagnetic material or compensated ferrimagnetic material are also contemplated. Those skilled in the art will know that the latter two types of magnetic materials can be poled such that the spins are ordered, without providing macroscopic magnetization to the material.

Figure 1:
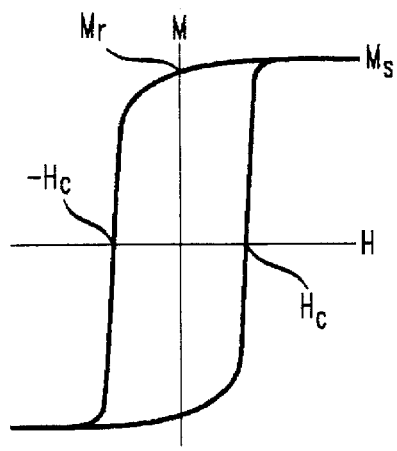
FIG. 1 schematically shows a general M-H loop.

The terms "magnetically hard" and "magnetically soft" are well understood by those skilled in the art. The terms relate to characteristics of the magnetization loop (also referred to as the M-H loop) of a magnetic material. FIG. 1 shows an exemplary M-H loop, and defines such parameters as the coercive field $H_c$, saturation magnetization $M_s$, and remanent magnetization $M_r$. See also, for instance, B. D. Cullity, "Introduction to Magnetic Materials", Addison-Wesley 1972, pp. 18–21, incorporated herein by reference, which illustrates the meaning of "major loop" and "minor loop".

Figure 2:
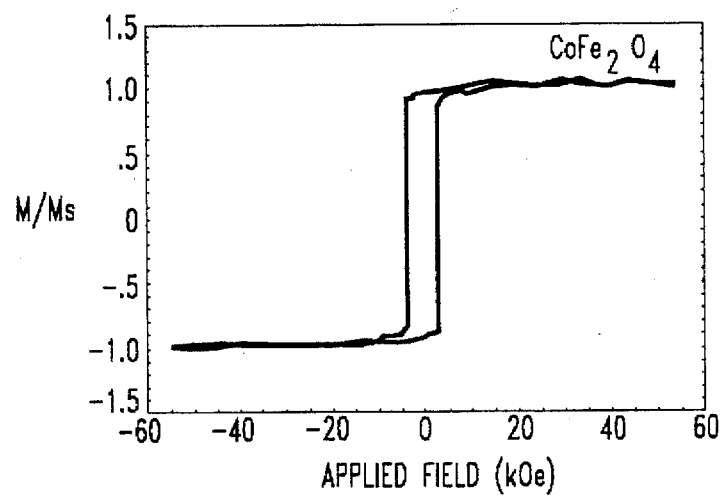
FIGS. 2 and 3 show the M-H loops of, respectively, a magnetically hard and a magnetically soft metal oxide material.
Figure 3:
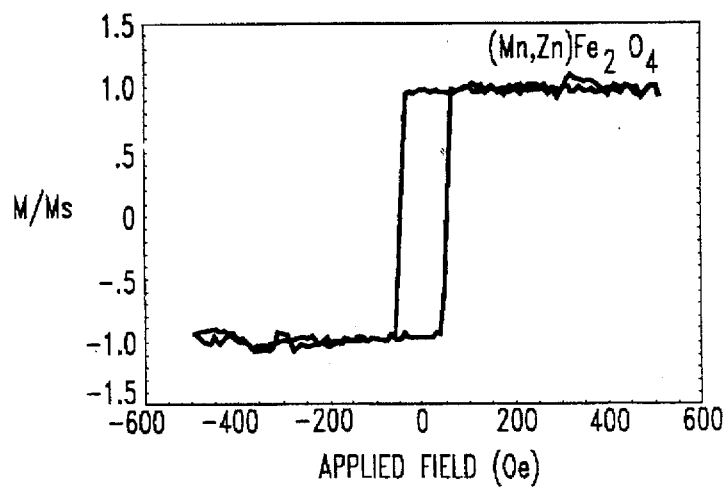

FIG. 2 shows the room temperature magnetization loop of an exemplary magnetically hard metal oxide material, namely, a (011)-oriented $CoFe_2O_4$ film, with H applied in the easy (100) direction in the plane of the film, and FIG. 3 shows the room temperature magnetization loop of an exemplary magnetically soft material, namely a (011)-oriented $Mn_{0.5}Zn_{0.5}Fe_2O_4$ film, with H also applied along the in-plane (100) direction. Exemplarily, a magnetically hard material herein has $H_c \gtrsim 500$ Oe, and a magnetically soft material has $H_c \lesssim 50 Oe$. The magnetically hard material will advantageously have $H_c \lesssim 15$ kOe, to facilitate poling of the material by conventional magnet means. However, materials with $H_c > 15$ kOe can be poled in a pulse magnetic field and are not precluded.

Figure 4:
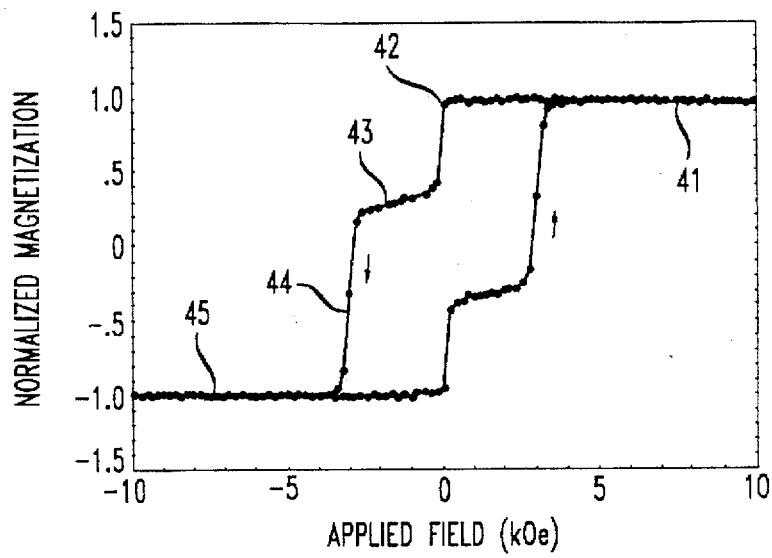
FIG. 4 shows the major M-H loop of a combination of the magnetically hard and soft oxides of FIGS. 2 and 3.

FIG. 4 shows the loop of an exemplary combination according to the invention, namely, a $CoFe_2O_4$ film/ $Mn_{0.5}Zn_{0.5}Fe_2O_4$ film combination, oriented as specified for FIGS. 2 and 3. The films were substantially single crystal and epitaxial with each other. The data were taken at room temperature. The data are interpreted as follows:

For large positive H (at portion 41 of the loop) the magnetization of both films is saturated and oriented parallel to the applied field. As the field strength is reduced towards zero, the magnetization remains substantially unchanged. Significant change in the magnetization occurs when the applied field has gone through zero and is small and negative (portion 42 of the loop). Under these conditions the magnetization of a portion of the soft layer reverses in direction. At portion 43 of the loop the magnetization of the soft layer substantially is parallel to the applied field, whereas the magnetization of the hard layer substantially is antiparallel to the applied field. Further increase in negative H results in reversal of the magnetization of the hard layer (portion 44) and saturation of the magnetization of the combination (portion 45). Sweeping the applied field from large negative values through zero to large positive values traces the remaining portion of the M-H loop.

Figure 5:
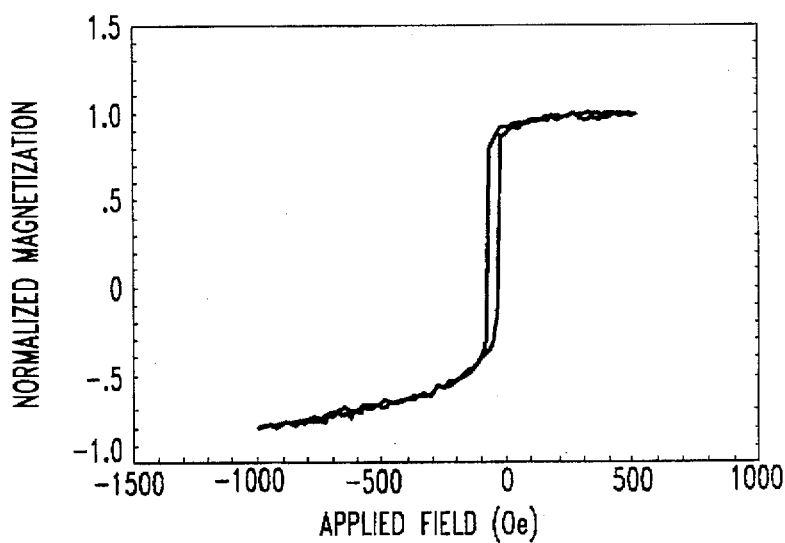
FIG. 5 shows a portion of the M-H loop of FIG. 4 with expanded scale of the magnetic field.

An important aspect of the magnetic behavior of combinations according to the invention is the pinning of the spins of the magnetically soft material at the interface by the spins of the bias layer, resulting in magnetization asymmetry. This is more clearly shown in FIG. 5, which was obtained from the combination of FIG. 4. The M-H loop of FIG. 5 was obtained by first applying a field of +10 kOe, and then tracing a (minor) loop over the range +500 to –1000 Oe. $M_s$ of the magnetically hard layer was subtracted from the data, with FIG. 5 showing the M-H loop of only the magnetically soft layer. The asymmetry in shape and the offset with regard to H=0 are due to exchange coupling between the magnetically hard and soft layers. The offset is approximately 100 Oe, and is referred to as $H_{ex}$. It is important to note that although the M-H loop is a minor loop for the overall layer combination, it is effectively a major loop for the magnetically soft layer, since this layer is driven from positive saturation to negative saturation and back.

As those skilled in the art will recognize, in combinations according to the invention the biasing layer provides asymmetry, somewhat akin to the asymmetry provided by an applied static magnetic field. This asymmetry can insure that the magnetically soft layer returns to the single-domain state for a significant range of applied magnetic fields (including stray magnetic fields), and thus eliminates energy dissipation due to domain wall motion in the magnetically soft layer under typical operating conditions of circuit elements that comprise the combination. Such circuit elements thus are substantially not subject to a major shortcoming of corresponding prior art circuit elements (namely, dissipation due to domain wall motion), and can be used at higher frequencies than the prior art components.

In currently preferred embodiments the biasing layer is a hard ferromagnetic or ferrimagnetic material. In this case the spins in the magnetically soft layer adjacent to the interface will typically be pinned in parallel orientation (although other orientations such as antiparallel are not excluded) to the spins in the biasing layer, assuming that the spins in the biasing layer are ordered. Such ordering of course is readily achieved by application of a field of strength sufficient to produce magnetization saturation in the biasing layer.

The magnetically hard biasing layer is advantageously selected to have relatively high crystal anisotropy (e.g., greater than about $10^5$ ergs/cm$^3$) and coercive force (e.g., greater than about 500 Oe) in the plane of the layer, with the layer typically poled in an easy magnetization direction in the plane of the film.

Figure 6:
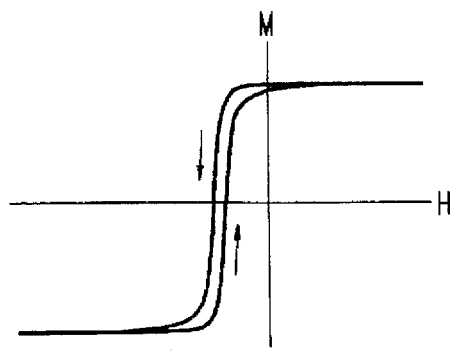
FIG. 6 schematically shows the M-H loop of a combination according to the invention that comprises an antiferromagnetic (or compensated ferrimagnetic) biasing layer.

FIGS. 4 and 5 are exemplary of the M-H loops of combinations according to the invention that comprise a ferromagnetic or ferrimagnetic biasing layer. FIG. 6 shows a schematic M-H loop of a combination that comprises a ferro-or ferrimagnetic magnetically soft layer and a compensated ferrimagnetic or antiferromagnetic biasing layer. As those skilled in the art will appreciate, in the case exemplified by FIG. 6 the biasing layer does substantially not contribute to the magnetization of the combination, but does serve to pin the soft material spins adjacent to the interface, assuming the biasing layer is appropriately poled. Such poling can be achieved, for instance, by cooling of the combination through the Neel temperature in the presence of a magnetic poling field. Desirably, the easy axis of the biasing layer lies in the plane of the layer.

The magnetically soft layer of combinations according to the invention typically is a ferromagnetic or ferrimagnetic material, desirably such a material having relatively low crystal anisotropy (e.g., less than $10^3$ ergs/cm$^3$), low coercive force (e.g., $\leq 50$ Oe), and high magnetization ($M_s \geq 20$ emu/cm$^3$).

Preferred embodiments of the invention comprise a substantially single crystal biasing layer, oriented such that an easy axis lies in the plane of the layer. Currently most preferred are combinations that furthermore comprise a substantially single crystal magnetically soft layer that is epitaxial with the biasing layer.

By "substantially single crystal" we mean herein material having $\chi_{min} < 20\%$. The RBS ratio $\chi_{min}$ is a conventional measure of crystalline perfection in thin films, using $^4$He ions at 2 MeV.

The layers can be deposited on a substrate in arbitrary order, with the order selected to meet given requirements. If it is desired that the first-deposited layer is a substantially single crystal layer, then the substrate has to be a single crystal substrate, of suitably chosen composition, lattice structure and lattice constant. Growth of a heteroepitaxial layer on a single crystal substrate is well known and does not require detailed discussion. In some cases it may be desirable to grow a buffer layer on the single crystal substrate, and to form the first layer of the combination according to the invention on the buffer layer. Use of a buffer layer in aid of epitaxial growth is also known to those skilled in the art.

For technological applications it is clearly of considerable importance that combinations according to the invention exhibit exchange anisotropy over a temperature range that includes room temperature, thereby avoiding the expense and inconvenience of cooling devices according to the invention. Our discovery of suitable combinations of magnetic oxides thus is considered a significant aspect of the invention.

Figure 7:
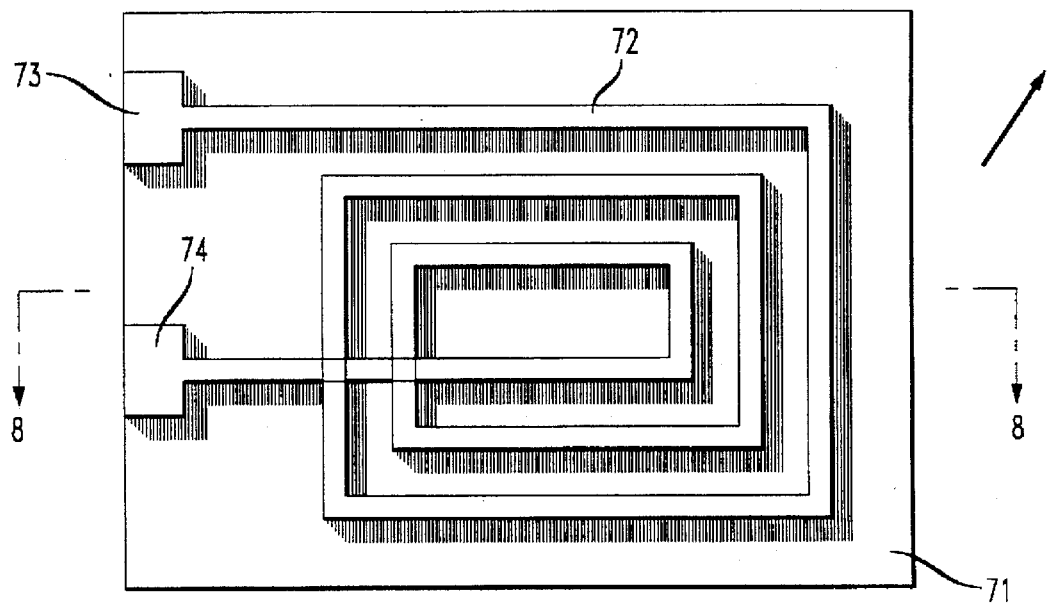
FIGS. 7 and 8 schematically depict an exemplary article according to the invention, namely, an inductor.
Figure 8:
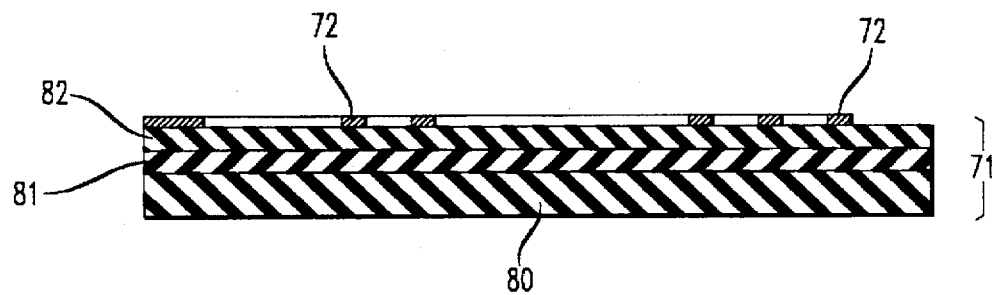

FIGS. 7 and 8 schematically depict an exemplary device according to the invention, namely, an inductor that is suitable for high frequency use. Reference numeral 71 refers to a composite body that comprises single crystal substrate 80, biasing layer 81, and soft layer 82 and optionally comprises a buffer layer (not shown) between substrate and biasing layer. On the magnetically soft layer is disposed conductive material in form of a spiral. Pads 73 and 74 facilitate electrical contact with the inductor. Optional spacers to separate crossing conductive paths are conventional and are not shown. The arrow in FIG. 7 exemplarily indicates the biasing layer poling direction.

Among currently preferred magnetic metal oxides for use in combinations according to the invention are spinel ferrites. These materials typically have moderately high resistivities (e.g., $10-10^6$ $\Omega$·cm), moderately high magnetizations (e.g., 300–400 emu/cm$^3$), and moderately low ferromagnetic resonance (FMR) linewidths (e.g., 2–200 Oe at ~10 GHz). For further detail on spinel ferrites and garnet ferrites see, for instance, W. H. yon Aulock, "Handbook of Microwave Ferrite Materials", Academic Press, New York, 1965.

Exemplary spinel ferrites for use as the second (i.e., magnetically soft) material are (Mn,Zn) Fe$_2$O$_4$, Li$_{0.5}$ Fe$_{2.5}$O$_4$, and (Ni, Zn) Fe$_2$O$_4$. Exemplary magnetically hard spinel ferrites are CoFe$_2$O$_4$, and (Mn, Ti)Fe$_2$O$_4$, with the former having a high bulk crystal anisotropy constant of about $3 \times 10^6$ erg/cm$^3$ and being currently most preferred. The notation such as (Mn, Zn)Fe$_2$O$_4$ is conventional, being short-hand for (Mn$_x$Zn$_{1-x}$) Fe$_2$O$_4$. The value of x is selected to yield desired properties (e.g., coercivity) for a given application, and is generally between 0 and 1.

Possible alternative biasing layers for spinel ferrite magnetically soft layers are NiO and Ni$_x$Co$_{1-x}$O(0<x<1), since the lattice constants of these (antiferromagnetic) materials are substantially half of those of many spinel ferrites, and since the crystal anisotropy of these materials is high.

Single crystal MgAl$_2$O$_4$ has lattice constant of about 0.818 nm and can advantageously be used as substrate for spinel ferrites, which typically have lattice constants in the range 0.830–0.840 nm. The moderate mismatch can be alleviated by use of an appropriate lattice-matching buffer layer. Paramagnetic CoCr$_2$O$_4$ and NiMnO 4 can advantageously serve as a buffer layer, and other buffer layer materials can be readily identified. We have used buffer layers that were about 50 nm thick. We annealed the buffer layers at 1000° C. in air for 30 minutes to improve crystallinity.

Spinel ferrites are not the only magnetic materials that are potentially useful in the practice of the invention. Among other potentially useful magnetic metal oxides are garnets (e.g., Y$_3$Fe$_5$O$_{12}$), and cobalt Y-type hexaferrites (e.g., Ba$_2$Co$_2$Fe$_{12}$O$_{22}$.

EXAMPLE

A (110) oriented crystal MgAl$_2$O$_4$ substrate was provided, and a 100 nm thick epitaxial CoCr$_2$O$_4$ buffer layer was formed thereon by laser deposition (substrate at 600° C.; 1 mT of 1% $O_2$, 99% $N_2$; KrF (248 nm) laser at 10 Hz, about 3 J/cm² energy density). The buffer layer was annealed in air at 1000° C. for 30 minutes, followed by formation of a 150 nm thick epitaxial $Mn_{0.5}Zn_{0.5}Fe_2O_4$ layer on the buffer layer by KrF laser deposition (substrate at 400° C.; 1 mT $O_2$; laser at 10 Hz, energy density about 4 J/cm²). This was followed by deposition of a 160 nm thick epitaxial layer of $CoFe_{24}$ by laser deposition, using the same deposition conditions.

The resulting layer combination was substantially single crystal, with the FWHM rocking curve line width of the (440) reflection being 0.6°. Magnetic measurements of the combination yielded the results shown in FIG. 4.

The invention claimed is:

1. An article comprising a first magnetic material layer and a second magnetic material layer having an interface with the first magnetic material layer, associated with each of the first and second magnetic material layers being a spin orientation, the first and second magnetic material layers selected such that, over a temperature range that includes room temperature, exchange coupling causes the spin orientation in at least a portion of the second magnetic material layer that is adjacent to said interface to be a function of the spin orientation of the first magnetic material layer such that a M-H loop of said second magnetic material layer is an asymmetric M-H loop; CHARACTERIZED IN THAT a) the first and second magnetic material layers comprise a first and a second metal oxide magnetic material, respectively;
   b) said first and second magnetic material layers are epitaxial with each other; and
   c) the spin orientation of the first magnetic material layer has a preferred direction that is substantially parallel to said interface.

2. An article according to claim 1, wherein said first and second metal oxide magnetic materials are selected from the group consisting of the oxides having a spinel crystal structure, the oxides having a garnet crystal structure, and the oxides having a cobalt Y hexaferrite crystal structure.

3. An article according to claim 2, wherein each of the first and second metal oxide magnetic materials has the spinel crystal structure, or has the garnet crystal structure, or has the cobalt Y hexaferrite crystal structure.

4. An article according to claim 3, wherein the first metal oxide magnetic material is a ferromagnetic or ferrimagnetic oxide material having coercivity $H_c$>500 Oe at 20° C., and the second metal oxide magnetic material is a ferromagnetic or ferrimagnetic oxide material having coercivity $H_c$<50 Oe at 20° C.

5. An article according to claim 4, wherein the first metal oxide magnetic material is selected from the group consisting of $CoFe_2O_4$ and $Mn_xTi_{1-x}Fe_2O_4$, and wherein the second magnetic oxide material is selected from the group consisting of $Mn_xZn_{1-x}Fe_2O_4$, $Li_{0.5}Fe_{2.5}O_4$, and $Ni_xZn_{1-x}Fe_2O_4$, where $0<x<1$.

6. An article according to claim 2, wherein the first metal oxide magnetic material is selected from the group consisting of the ferrimagnetic oxides having spinel crystal structure and the ferrimagnetic oxides having garnet crystal structure and has a compensation temperature, the first metal oxide magnetic material selected to have a compensation temperature in the range 20° C.±50° C.

7. An article according to claim 6, wherein the first metal oxide magnetic material is $NiFeCrO_4$.

8. An article according to claim 5, wherein the first metal oxide magnetic material is $CoFe_2O_4$.

9. An article according to claim 1, wherein the first metal oxide magnetic material is selected from the group consisting of NiO and $Ni_xCo_{1-x}O$, with $0<x<1$, and the second metal oxide magnetic material is selected from the group consisting of the oxides having the spinel crystal structure.

10. An article according to claim 1, wherein at least one of the first and second magnetic material layers is a substantially single crystal thin film.

11. An article according to claim 10, wherein both magnetic material layers are substantially single crystal planar thin films.

12. An article according to claim 1, further comprising a patterned metal layer disposed on said second magnetic material layer.

13. An article according to claim 12, wherein the patterned metal layer comprises a metal spiral adapted for use an an inductor.

14. Article according to claim 1, wherein the layer combination has an interface anisotropy energy $K_{int}$>$10^{-2}$ erg/cm² at room temperature.

15. Article according to claim 1, wherein the asymmetric M-H loop has an offset of at least 100 Oe.

* * * * *